United States Patent [19]
Greenberg et al.

[11] 3,920,864
[45] Nov. 18, 1975

[54] TRANSPARENT METAL FILM HAVING A BROWN-GRAY APPEARANCE

[75] Inventors: Charles B. Greenberg, Murrysville; Peter P. Harmon, Irwin, both of Pa.

[73] Assignee: PPG Industries, Inc., Pittsburgh, Pa.

[22] Filed: Aug. 1, 1973

[21] Appl. No.: 384,763

[52] U.S. Cl.................. 427/169; 427/168; 427/163; 427/343; 427/304
[51] Int. Cl.......................... B44d 5/06; C03c 17/10
[58] Field of Search........... 117/33.3, 124 A, 124 C, 117/71 R

[56] References Cited
UNITED STATES PATENTS

| | | | |
|---|---|---|---|
| 1,935,520 | 11/1933 | Peacock............................ | 117/71 R |
| 3,437,515 | 4/1969 | Quinn et al..................... | 117/124 A |
| 3,457,138 | 7/1969 | Miller................................. | 161/196 |
| 3,537,944 | 11/1970 | Grubb et al...................... | 117/71 R |

*Primary Examiner*—Cameron K. Weiffenbach
*Assistant Examiner*—Ralph E. Varndell
*Attorney, Agent, or Firm*—E. Kears Pollack

[57] ABSTRACT

Transparent articles, each having a low-reflectance, brown-gray appearance, are produced by first applying a copper film to glass, then partially replacing the copper with silver and then briefly exposing the film to an oxidizing environment. A copper-coated glass article having a pink appearance is contacted with a silver salt, such as silver nitrate, in aqueous solution together with an alkaline buffer, such as ammonia, and an alkali metal thiosulfate, such as sodium thiosulfate. The coated glass article is then exposed to moist air, and the pink-appearing copper film is converted to a low-reflectance, brown-gray film.

8 Claims, No Drawings

TRANSPARENT METAL FILM HAVING A BROWN-GRAY APPEARANCE

BACKGROUND OF THE INVENTION

1. Field of the Invention

This invention relates broadly to methods of coating transparent articles, such as glass. In particular, this invention relates to methods for producing brown-gray films on glass with the films containing copper and silver,

2. Description of the Prior Art

Metal-coated, transparent articles have been produced by various well-known electroless or wet chemical coating or plating techniques. These techniques generally involve the contacting of an article to be coated with suitable electroless coating solutions to deposit a metal film thereon by reducing the metal from a metal salt in the coating solution. Both autocatalytic coating techniques and exhaustive coating techniques are known. Principal amoung the autocatalytic techniques are those wherein an alkali metal hypophosphite, formaldehyde or like reducing agents are employed. In such techniques the reducing agent and the metal salt to be reduced are typically present in a single solution. This solution is generally not subject to rapid reaction until placed into contact with a catalytic or sensitive surface. Exemplary autocatalytic techniques are those described in U.S. Pat. No. 2,532,283 and U.S. Pat. No. 2,532,284, both to Brenner and Riddell. Other techniques of this type are described in patents such as U.S. Pat. No. 2,956,900 to Carlson et al.

Exhaustive electroless coating techniques are also known. Principal among these techniques are those wherein a boron-containing reducing agent is used to reduce a metal from a metal salt-containing solution. In these techniques the reduction reaction will proceed rapidly, once the reducing agent is present together with the metal salt-containing solution. It is therefore usually necessary to apply separate solutions of these reactants substantially simultaneously to a substrate to be coated.

The reflectance and transmittance characteristics of glass may also be modified by introducing metals into the surface of the glass itself. Typical staining techniques for accomplishing this are described in U.S. Pat. No. 2,701,215 to Kroeck and U.S. Pat. No. 3,079,264 to Grego et al. The techniques described in these patents employ silver compounds in addition to copper compounds. Sulfur-containing compounds are employed in the practice of these disclosed techniques. These techniques are, however, not coating techniques and they do not yield true films on the surfaces of treated substrates.

While the practice of plating bulk metals presents substantially different problems than the coating of transparent articles with thin, transparent reflective films, immersion plating techniques for such purposes are well known. As described in the *Metal Finishing Guidebook* for 1965, at page 407, there is described a method for plating silver over copper metal. The method comprises contacting a copper article with a solution containing 1 ounce-per-gallon of silver nitrate, 10 ounces-per-gallon ammonia, 14 ounces-per-gallon of sodium thiosulfate.

The preparation of thin, transparent films on transparent substrates, particularly on large sheets of glass for architectural use, presents particular problems which are not present in the coating of opaque articles, particularly opaque metallic articles. In the making of large, transparent, coated articles for architectural use, it is of extreme importance that films of uniform thickness, transmittance and reflectivity be produced in order for the articles to have a uniform esthetic appearance. Various metals have been successfully deposited on glass and other transparent substrates by electroless coating techniques. For example, films comprising one or more of the following metals have been successfully deposited on large substrates suitable for architectural use: iron, cobalt, nickel, copper, silver and the like.

A few of the known patented electroless coating techniques have been successfully employed to produce high-quality films, each having an attractive esthetic appearance and a high reflectivity for energy in the infrared range. Coated glass produced according to these known techniques has been effectively used in buildings where it is desired to provide attractive windows or curtain walls which will effectively reject solar energy and minimize the load imposed on environmental conditioning systems servicing such structures. Commercially significant architectural products having such characteristics have been produced according to the teachings of U.S. Pat. No. 3,457,138 to R. G. Miller.

This patent to R. G. Miller describes methods for making coopersilver films that are highly-efficient reflectors for infrared radiation. Following the teachings of this patent, films that are rich in copper have been produced, and these films have a pink appearance. Such films have both a pleasing appearance and a high environmental efficiency. It has been an objective, nevertheless, to produce films having other apparent colors in order to satisfy a broad range of esthetic desire. The present invention provides a method for producing films having a brown-gray appearance.

SUMMARY OF THE INVENTION

Brown-gray, transparent articles are prepared by preparing copper- and silver-containing films on transparent substrates, such as sheets of glass. Large sheets of glass coated according to this invention are useful as windows.

In the practice of this invention the surface of a substrate to be coated is first cleaned by conventional cleaning procedures. The substrate surface is then prepared for coating and coated with a thin, copper film. This may be accomplished by vapor deposition, sputtering, electrolytic deposition or electroless deposition. A preferred method for applying copper is by electroless deposition, particularly by following the teachings of U.S. Pat. No. 3,457,138.

The surface of the copper film on the substrate is contacted with an aqueous solution containing a silver salt and a complexer for copper. The copper complexer is preferably a complexer for silver as well, such as, for example, an alkali metal or ammonium thiosulfate. Other thiosulfates, such as alkaline earth thiosulfates or metal thiosulfates, such as lead or silver thiosulfate, may be used. The silver solution is generally alkaline and preferably contains an alkaline buffer, such as, for example, ammonium hydroxide. This silver solution is maintained in contact with the copper film for a short period of time, and the silver present in the solution apparently replaces, in part, a portion of the copper in the film.

Thereafter, the copper and silver film is exposed to an oxidizing environment for a sufficient time to cause the film to change in appearance from its characteristic pink color to a brown color. Moist air, moist oxygen or moist nitrogen can each serve as an effective oxidizing environment. A film of water may be maintained on the film and act as an effective oxidizing environment, possibly due to dissolved oxygen. The oxidizing environment may comprise water vapor and any inert gas or may comprise hydrogen sulfide, sulfur dioxide, ozone or the like.

The visible light reflectance of the film is observed to decrease initially at a rapid rate and thereafter at a diminishing rate until it stablizes during exposure to the oxidizing environment. The film conversion is preferably permitted to continue until the visible light reflectance of the film stabilizes.

Throughout this discussion the term "brown-gray" is used to mean brown, brownish-gray, or brownish-black according to the conventions of the Inter-Society Color Council and the National Bureau of Standards. "Brown-gray" color or appearance, when quantitatively expressed, using the conventional CIE System, means that the article in question has a dominant reflective wavelength between 575 and 625 nanometers, a reflection excitation purity between 5 and 85 percent and a Y-tristimulus value or luminous reflectance between 0.1 and 40 percent. This is based upon viewing the film through a clear substrate. See Hardy, *Handbook of Colormetry* for discussion, and also see ISCC-NBS Color-Name Charts Supplement to NBS Circular 553.

Coated glass sheets prepared according to this invention are used in double-glass windows for architectural use. A coated glass sheet is preferably used as the outer panel in such windows with its coated side facing the enclosed space separating the panels. The outside or exterior appearance of the window is brown-gray due to reflection. The lighted interior of the building is subjected to a soft neutral lighting. The window effectively blocks out excessive solar heat.

DESCRIPTION OF THE PREFERRED EMBODIMENTS

Large sheets or plates of flat glass are coated according to this invention for use as windows. Sheets of clear, soda-lime-silica glass, each having a thickness of about one-fourth inch and measuring about 4 feet by 6 feet, are prepared for coating. A glass sheet is placed on a substantially horizontal conveyor and is conveyed to a cleaning section of a continuous coating line. In this section a plurality of rotating discs or blocks gently abrade the upper surface of the sheet, preferably with a mixture of cerium oxide or rouge with water. This loosens any dirt adhering to the glass. This operation, called a blocking operation, is preferably carried out using felt blocks, with each block rotated continuously at a rate of about 200 to 600 revolutions-per-minute. The blocks are preferably oscillated over a short amplitude in a direction transverse to the advancing sheet of glass to insure that the entire upper surface of the sheet is blocked. After blocking, the sheet advances beneath a plurality of rotary-cup brushes that wash the surface with tap water. The brushes are rotated and oscillated in a manner similar to the rotation and oscillation of the blocks. Each sheet then advances beneath a transverse brush or squeegee that engages the entire upper surface of the sheet and is employed to brush or sweep away the wash water used to clean the sheet. A continuous line apparatus, such as shown in U.S. Pat. No. 3,723,155 to Greenberg and Crissman, may be effectively employed in the practice of this invention.

After cleaning, each clean glass sheet is contacted with a dilute solution of a sensitizing agent for a short time, usually under ambient conditions at room temperature (50° to 95°F.). The glass sheet is then rinsed with water, preferably a relatively pure water, such as deionized or demineralized water. The sensitizing agent employed is preferably a tin salt. Any of a variety of salts may be employed in an aqueous solution to carry out the sensitizing step. For example, the following salts may be employed: stannous chloride, stannous bromide, stannous iodide, stannous sulfate or the like. Stannous chloride is a preferred sensitizing agent.

After the glass sheet has been sensitized, it is preferably activated. This activation may be carried out according to the teachings of Bergstrom, U.S. Pat. No. 2,702,253, using a palladium salt.

The glass sheet is then preferably treated by contacting the glass with an aqueous, ammoniacal silvering solution. The glass is treated by contacting it with an aqueous, ammoniacal silvering solution prepared by intermixing two solutions prior to the time of contact and contacting the glass surface with this mixture. The two solutions, which are intermixed, are: a first solution containing an ammoniacal silver salt and a second solution containing a reducing agent. This contacting step results in a ammoniacal deposition of an extremely thin silver film which can be referred to as a "flash" silver film. The thickness of this silver film is sufficient to reduce the visible light transmittance of the coated article to 70 to 85 percent, and preferably to within the range of 78 to 82 percent, from the visible light transmittance of the uncoated glass, which is about 88 percent. This contacting step is preferably carried out at ambient room temperature.

Any convenient water-soluble or water-dispersible silver salt can be used in forming the silvering solution. It is, however, preferable to employ an aqueous solution containing a soluble silver salt, such as silver sulfate, silver nitrate, or silver chloride or the like. Silver nitrate is the silver salt that is preferred for use.

The ammoniacal silver salt solution is preferably prepared by dissolving silver nitrate in demineralized or otherwise pure water and then adding an aqueous solution of ammonium hydroxide thereto. The aqueous silvering solution can contain from about 0.0001 to about 10.0 percent by weight of a selected ammoniacal complex silver salt (that is, ammoniacal silver nitrate). Usually the concentration of the silver salt ranges from 0.001 to 1.0 percent with a concentration of from 0.01 to 0.1 percent preferred. The silvering solution may be stabilized according to the teachings of U.S. Pat. No. 3,723,138 if it is desired to extend the stable life of the silvering solution.

The silver reducing agent is provided in the reducing agent component of the intermixed solution. The reducing agent may be formaldehyde, dextrose, an invert sugar or the like. The reducing agent is present in the solution in an amount from about 0.001 to 25 percent by weight. Usually the weight concentration of the reducing agent is within the range of from 0.005 to 5.0 percent by weight, and preferably it is present in an amount from 0.008 to 1.0 percent by weight.

Following the deposition of the flash, metallic silver film in the preferred embodiment, the glass is coated with copper. The activated and treated glass surface is contacted with an aqueous, alkaline, copper- coating solution containing a water-soluble or water-dispersible copper salt, a reducing agent, preferably a complexer for the copper, a pH control agent and the salt of a metal selected from nickel or cobalt. The copper salt which is employed is preferably copper sulfate, though other copper salts may be employed. The reducing agent for the copper is preferably formaldehyde, though other reducing agents may be employed. The preferred complexer is a tartrate salt, such as sodium potassium tartrate. Other complexers, such as, for example, ethylene diamine tetraacetic acid, may be employed. A preferred pH control agent is sodium hydroxide, though other alkalis may be employed.

The copper is applied to the glass by spraying, or otherwise causing the copper-coating solution to contact the already treated glass surface. Preferably the copper-coating step is carried out at ambient room temperature. Contact time ranges from 30 seconds to about 5 minutes and is sufficient to deposit a thin, transparent copper film on the glass. The silvering and coppering steps described here as part of the preferred embodiment of this invention are substantially those taught in U.S. Pat. No. 3,457,138 to R. G. Miller. The disclosure of U.S. Pat. No. 3,457,138 is specifically incorporated by reference in this application. p The copper film on the glass has a pink appearance. The film in combination with the glass has a luminous or visible light transmittance of about 15 to 35, and preferably from 28 to 29 percent. Depending upon the total silver and copper contact times, the luminous transmittance may be varied. The luminous reflectance from the coated surface of the glass sheet is from about 35 to 50 percent, and usually about 40 percent. The luminous reflectance from the uncoated surface of the glass sheet is from about 25 to 35 percent, and usually about 30 percent.

The copper-coated surface of the glass sheet is then contacted with a replacement solution containing silver nitrate, sodium thiosulfate and ammonium hydroxide. On the basis of one liter of water, the solution comprises from 0.5 to 1.5 grams silver nitrate, from 1.0 to 3.0 grams of sodium thiosulfate ($Na_2S_2O_3.5H_2O$) and from 0.5 to 1.5 cc ammonium hydroxide. This solution is maintained in contact with the copper film for from about 30 seconds to 2 minutes.

The replacement solution is then rinsed from the copper-coated surface of the glass sheet with water, and the resulting film is subjected to a moist air environment. In a preferred embodiment warm air having a temperature within a range from about 60°F. to about 150°F. and a relative humidity within the range of from 35 percent to about 90 percent is blown against the coated surface to dry it and to cause the surface reactions to proceed rapidly until the film properties substantially stabilize within from about to 30 seconds to 5 minutes.

Alternatively, the film may be dried and allowed to remain in quiescent, ambient air having a temperature of from 65°F. and a relative humidity of from 35 percent to about 60 percent for a period of about 5 to 10 minutes to stabilize its properties. These conditions are suitable for practicing this invention and are easily attained. Conversion of the film will proceed rapidly at even higher or lower temperatures and relative himidities. After the coated glass sheet has been exposed to moist air for a sufficient time, its appearance changes from an initial pink having a high reflectivity to a brown-gray having a lower reflectivity.

The resulting article has a luminous reflectance from its coated surface of about 40 percent and a luminous reflectance from its uncoated surface of about 14 percent. The luminous transmittance of the brown-gray appearing coated article is from about 10 to 30 percent, and usually from about 15 to 25 percent. The coated glass sheet has a transmittance dominant wavelength within the range of from about 480 nanometers to about 500 nanometers, usually about 487 nanometers, which contrasts with the transmittance dominant wavelength for the copper-silver film prior to replacement treatment and oxidation of from about 550 nanometers to about 650 nanometers.

The preferred coated glass sheets of this invention have the following characteristics based upon a clear, soda-lime-silicia glass substrate having a thickness of one-fourth inch. The luminous transmittance is from 10 percent to 30 percent. The dominant transmittance wavelength is from 480 nanometers to 500 nanometers. The excitation purity for transmitted light is from 3 percent to 10 percent. The luminous reflectance from the film is from 30 percent to 50 percent. The dominant reflected wavelength from the film is from 500 to 620 nanometers. The excitation purity for light reflected from the film is from 0.1 percent to 10 percent. The article has a brown-gray appearance when viewed toward the glass with the film seen through the glass. The luminous reflectance from the glass is from 10 percent to 20 percent. The dominant reflected wavelength from the glass is from 575 nanometers to 620 nanometers. The excitation purity for the brown-gray light reflected from the glass side, viewing the film through the glass, is from 5 percent to 25 percent.

The present invention will be further understood from the description of specific examples which follow.

EXAMPLE I

Sheets of clear, soda-lime-silica glass are cleaned, sensitized, activated with palladium, treated with silver and coated with copper as described above to yield coated sheets of glass having a pink, highly reflective appearance when viewed toward either surface. The coated sheets of glass have a luminous transmittance of about 29 percent. The luminous reflectance from the coated surface of each sheet is about 40 percent, and the luminous reflectance from the uncoated surface of each sheet is about 30 percent.

Each coated sheet of glass has its copper-coated surface contacted for about 75 seconds with a replacement solution maintained at about ambient room temperature. The replacement comprises, on a basis of one liter of water, 0.67 gram sodium nitrate, 2.0 grams sodium thiosulfate and 0.67 cc ammonium hydroxide. Replacement solution is distributed uniformly over the copper-coated surface of the glass sheet and is maintained there for about 75 seconds. It is then rinsed away and the glass sheet, covered with a film of water, moves along the conveyor to an air knife. The water remains on the treated film for about 1 to 2 minutes. The glass sheet is then conveyed past the air knife spaced just above the coated surface of the sheet.

The air knife directs air against the sheet of glass as it passes beneath. The air from the air knife has a temperature of about 130°F. and a relative humidity of 55 percent. The effective residence time of the coated sheet beneath the air knife is about 2 seconds. The resulting coated article has a brown-gray appearance, a luminous transmittance of about 22.0 percent, a total solar infrared transmittance of about 14.0 percent, a luminous reflectance from its coated surface of about 36.3 percent, a total solar infrared reflectance from its coated surface of about 37.1 percent, a luminous reflectance from its uncoated surface of about 14.8 percent and the total solar infrared reflectance from its uncoated surface of about 12.5 percent. All characteristics of the article are determined using a Beckman Instruments DK-2A Spectroreflectometer according to conventional analytical techniques, e.g., illuminant "C" and magnesium carbonate as a standard white reflector.

EXAMPLE II

A copper film is deposited on a sheet of clear, soda-lime-silica glass by vacuum deposition under the following conditions: The sheet of glass is placed in a vacuum chamber, and the chamber is evacuated to a pressure of $5 \times 10^{-5}$ torr. Copper is evaporated in the vicinity of the glass sheet while the sheet is maintained at room temperature. The deposition of the copper is monitored and when a film of about 30 percent transmittance is achieved coating is stopped.

This copper film is subjected to treatment with a replacement solution and to exposure to moist air.

The film changes as visually observed. The film is not as durable as the film of Example I, and no quantitative determination of film properties is made.

EXAMPLE III

This example demonstrates the importance of the step of exposing replacement solution treated films to an oxidizing environment in order to cause the transformation of a pink copper film to a brown-gray, copper, silver, and sulfur-containing film. Three samples of glass are prepared, and each is coated with copper as in Example I. Each sample of glass is subjected to identical replacement solution treatment, using a replacement solution having the constituents present in the following amounts:

| water | 1.0 | liter |
| silver nitrate | 1.0 | gram |
| sodium thiosulfate | 3.0 | grams |
| ammonium hydroxide | 1.0 | cc |

Each sample is subjected to treatment with the replacement solution at ambient room temperature for about 50 seconds. One sample is maintained at ambient room conditions having a temperature of about 75°F. and a relative humidity of about 60 percent. A second sample is placed in a vacuum chamber and maintained there except for occasional removal to measure film properties. The third sample is treated with an aqueous solution of 3-amino 1H-1,2,4-triazole solution at room temperature for 4 minutes. The solution contains 0.133 gram of triazole per liter of water. This treatment is intended to passivate the film.

The properties of all samples are noted immediately after treatment with the replacement solution. The luminous reflectance from the coated surface of each sample is about 48 percent and the luminous reflectance from the uncoated surface of each sample is about 21 percent. Each sample is analyzed over a period extending for 30 minutes. The results of these observations are summarized in the following table.

TABLE

| Elapsed Time (Minutes) % Reflectance from Film | 0 | 1 | 2 | 5 | 10 | 20 | 30 |
|---|---|---|---|---|---|---|---|
| Sample 1 (ambient) | 48 | 46 | 45 | 42 | 40.5 | 40 | 40 |
| Sample 2 (vacuum) | 48 | 47.9 | 47.8 | 47.5 | 47 | 46 | 46 |
| Sample 3 (passivated) | 48 | 47 | 47 | 47 | 47 | 47 | 47 |
| % Reflectance from Glass | | | | | | | |
| Sample 1 (ambient) | 21 | 19 | 17 | 15 | 14 | 13.5 | 13.5 |
| Sample 2 (vacuum) | 21 | 20.5 | 20 | 19.5 | 19 | 19 | 19 |
| Sample 3 (passivated) | 21 | 20 | 20 | 20 | 20 | 20 | 20 |

From the above table it is apparent that under ambient conditions a copper film, once treated with a replacement solution and exposed to an oxidizing environment, quickly changes in reflectance, ultimately developing stable reflectance characteristics. It is apparent that copper films so treated but maintained in vacuum (except for the time elapsed during removal from vacuum for analysis) do not undergo such a complete transformation in film characteristics. It may also be observed that replacement solution treated copper films immediately treated with a passivating agent undergo no transformation whatsoever.

The present disclosure is not intended to limit the scope of the applicants' claimed invention. It will be evident to those skilled in the art that variations and modifications may be made to the disclosed method of preparing brown-gray appearing films without departing from the spirit of this invention. For example, this invention contemplates coating transparent substrates having visible or luminous transmittances as low as 1 to 5 percent and transparent substrates sufficiently pure in any hue to mask the brown-gray color of the film, as viewed through the substrate. Substrates other than glass, such as, for example, organic polymeric materials, may be coated according to this invention.

We claim:
1. A method of preparing a coated, transparent article comprising the steps of:
   a. applying a copper film to a surface of a transparent substrate;
   b. contacting said copper film with a solution containing a silver salt in the presence of a thiosulfate; and
   c. maintaining said film in the presence of oxygen and water for a sufficient time film said film to develop a substantially stable luminous reflectance differ- ent from its luminous reflectance prior to its maintenance in the presence of oxygen and water.

2. The method according to claim 1, wherein said step of applying a copper film is accomplished by electrolessly depositing copper onto a surface of said article, wherein said copper film contacting step is accomplished with an aqueous, alkaline solution comprising water, a silver salt and an alkali metal or ammonium thiosulfate, and wherein in said step of maintaining said film in the presence of oxygen and water it is maintained in the presence of moist air.

3. The method according to claim 2 wherein said electroless deposition of copper is preceded by the step of applying a film of silver to the surface of said article to be coated.

4. The method according to claim 1 wherein said step of contacting said copper film is accomplished by contacting said copper film with an aqueous solution consisting essentially of:
   a. water;
   b. silver nitrate in an amount of from about 0.5 grams per liter to about 1.5 grams per liter;
   c. ammonia on a 28 percent basis in an amount of from about 0.5 cc per liter to about 1.5 cc per liter; and
   d. sodium thiosulfate in an amount of from about 1.0 grams per liter to about 3.0 grams per liter for a contacting time of from about 30 seconds to about 120 seconds.

5. The method according to claim 1, wherein the step of maintaining said film in the presence of oxygen and water is accomplished by directing a stream of water containing air against said film, said stream of air having a temperature within the range of from 60°F. to about 150°F. and a relative humidity within the range of from about 35 to about 90 percent.

6. A method of preparing a coated, transparent glass substrate having a brown-gray appearance when viewed toward its uncoated surface comprising the steps of:
   a. applying a copper film to a surface of a clear glass substrate;
   b. contacting said film with an aqueous alkaline solution comprising water and a silver salt in the presence of a thiosulfate; and
   c. maintaining said film in the presence of oxygen and water for a sufficient time for said film to develop a brown-gray appearance as viewed through said clear glass substrate and to develop a stable luminous reflectance when so viewed through said clear glass substrate.

7. A coated, transparent article prepared according to the method of claim 6.

8. The coated, transparent article according to claim 7 wherein said article comprises a clear glass substrate having a film thereon, said article having the following characteristics:
   a. luminous transmittance from 10 percent to 30 percent;
   b. dominant transmittance wavelength from 480 nanometers to 500 nanometers;
   c. excitation purity for transmitted light from 3 percent to 10 percent;
   d. luminous reflectance from the film from 30 percent to 50 percent;
   e. dominant reflected wavelength from the film from 500 nanometers to 620 nanometers;
   f. excitation purity for light reflected from the film from 0.1 percent to 10 percent;
   g. luminous reflectance from film side through substrate from 10 percent to 20 percent;
   h. dominant reflected wavelength from film side through substrate from 575 nanometers to 620 nanometers; and
   i. excitation purity for light reflected from film side through substrate from 5 percent to 25 percent.

* * * * *

UNITED STATES PATENT OFFICE
CERTIFICATE OF CORRECTION

PATENT NO. : 3,920,864
DATED : November 18, 1975
INVENTOR(S) : Greenberg et al

It is certified that error appears in the above-identified patent and that said Letters Patent are hereby corrected as shown below:

Column 8, line 67, "film" (first occurrence) should be --for--.

Signed and Sealed this twentieth Day of April 1976

[SEAL]

Attest:

RUTH C. MASON
Attesting Officer

C. MARSHALL DANN
Commissioner of Patents and Trademarks